(12) United States Patent
Jackson et al.

(10) Patent No.: US 6,504,161 B1
(45) Date of Patent: Jan. 7, 2003

(54) RADIATION INDICATOR DEVICE

(75) Inventors: Stuart A. Jackson, Edmonton (CA);
John R. Mercer, Edmonton (CA);
Elena Atrazheva, Edmonton (CA);
Karima Hudda, Edmonton (CA);
Sanyi Wang, Edmonton (CA)

(73) Assignees: Sunspots, Inc., Bellevue, WA (US);
Edge Medical, Inc., Bellevue, WA (US)

( * ) Notice: Subject to any disclaimer, the term of this patent is extended or adjusted under 35 U.S.C. 154(b) by 0 days.

(21) Appl. No.: 09/624,091

(22) Filed: Jul. 24, 2000

(30) Foreign Application Priority Data

Sep. 10, 1999 (CA) .............................................. 2282084

(51) Int. Cl.⁷ ................................................. G01N 5/00
(52) U.S. Cl. ..................................... 250/474.1; 250/372
(58) Field of Search ........................... 250/474.1, 372

(56) References Cited

U.S. PATENT DOCUMENTS

| | | | |
|---|---|---|---|
| 3,051,837 A | 8/1962 | Nitka | 250/474.1 |
| 3,102,197 A | 8/1963 | Acitelli et al. | 250/474.1 |
| 3,290,499 A | 12/1966 | Vale et al. | 250/474.1 |
| 3,449,572 A | 6/1969 | Sylvester et al. | 250/474.1 |
| 3,465,590 A | 9/1969 | Kluth et al. | 374/160 |
| 3,479,877 A | 11/1969 | Allen et al. | 374/106 |
| 3,501,297 A | 3/1970 | Cremeans et al. | 430/374 |
| 3,501,308 A | 3/1970 | Adelman | 430/332 |
| 3,665,770 A | 5/1972 | Sagi et al. | 374/160 |
| 3,677,088 A | 7/1972 | Lang | 374/159 |
| 3,691,380 A | 9/1972 | Hubner et al. | 250/474.1 |
| 3,704,985 A | 12/1972 | Pickett et al. | 374/160 |
| 3,743,846 A | 7/1973 | Matsumoto et al. | 250/474.1 |
| 3,787,687 A | 1/1974 | Trumble | 250/474.1 |
| 3,899,677 A | 8/1975 | Hori et al. | 250/474.1 |
| 3,903,423 A | 9/1975 | Zweig | 250/474.1 |
| 3,907,732 A | 9/1975 | Maruyama et al. | 250/474.1 |
| 3,966,414 A | 6/1976 | Khattab et al. | 422/119 |
| 3,980,581 A | 9/1976 | Godsey, Jr. et al. | 252/408.1 |
| 3,981,683 A | 9/1976 | Larsson et al. | 422/57 |
| 3,999,946 A | 12/1976 | Patel et al. | 422/56 |

(List continued on next page.)

FOREIGN PATENT DOCUMENTS

| | | |
|---|---|---|
| CA | 1121255 | 4/1982 |
| CA | 1152090 | 8/1983 |
| CA | 1156794 | 11/1983 |
| CA | 1237145 | 5/1988 |
| EP | 0 325 863 A2 | 8/1989 |

OTHER PUBLICATIONS

PCT/CA00/00791 International Search Report (4 sheets) dated Nov. 16, 2000.

Primary Examiner—Georgia Epps
Assistant Examiner—M. Hasan
(74) Attorney, Agent, or Firm—Terrence N. Kuharchuk; Rodman & Rodman

(57) ABSTRACT

A radiation indicator device for use in indicating exposure to ultraviolet-B radiation. The device includes a radiation sensitive mixture which is selectively responsive to ultraviolet radiation having a wavelength substantially within or shorter than the range of wavelengths of ultraviolet-B radiation. The radiation sensitive mixture includes an organic halogen constituent capable of producing at least one acidic product upon exposure to ultraviolet radiation and an indicator constituent capable of producing a change in color in response to a change in concentration of the acidic product. The radiation sensitive mixture has a first color representing a relatively low concentration of the acidic product and has a second color representing a relatively high concentration of the acidic product. The first color is visually distinguishable from the second color. The device may also include a graphic pattern interposed amongst the radiation sensitive mixture, which graphic pattern has a graphic pattern color substantially identical to either the first color or the second color.

43 Claims, 1 Drawing Sheet

U.S. PATENT DOCUMENTS

| | | |
|---|---|---|
| 3,999,987 A | 12/1976 | Davis et al. .................. 430/44 |
| 4,001,587 A | 1/1977 | Panchenkov et al. .... 250/474.1 |
| 4,008,085 A | 2/1977 | Lemahieu et al. .......... 430/335 |
| 4,042,366 A | 8/1977 | Fersch et al. ............... 428/403 |
| 4,125,534 A | 11/1978 | Yee .......................... 250/474.1 |
| 4,130,760 A | 12/1978 | Fanselow et al. ........ 250/474.1 |
| 4,189,399 A | 2/1980 | Patel ............................. 436/7 |
| 4,208,186 A | 6/1980 | Patel ............................. 436/2 |
| 4,215,208 A | 7/1980 | Yee et al. ................... 526/285 |
| 4,220,747 A | 9/1980 | Preziosi et al. ............. 526/285 |
| 4,228,126 A | 10/1980 | Patel et al. ................... 422/56 |
| 4,238,352 A | 12/1980 | Patel .......................... 526/285 |
| 4,308,459 A | 12/1981 | Williams ................. 250/474.1 |
| 4,339,240 A | 7/1982 | Patel .......................... 436/171 |
| 4,339,951 A | 7/1982 | Yee et al. ................... 374/162 |
| 4,384,980 A | 5/1983 | Patel .......................... 436/58 |
| 4,389,217 A | 6/1983 | Baughman et al. ............ 436/2 |
| 4,439,346 A | 3/1984 | Patel et al. .............. 252/408.1 |
| 4,452,995 A | 6/1984 | Patel et al. ................. 560/166 |
| 4,699,997 A | 10/1987 | Preziosi et al. ............. 560/166 |
| 4,721,769 A | 1/1988 | Rubner ....................... 356/43 |
| 4,737,463 A | 4/1988 | Bhattachariee et al. ........ 436/2 |
| 4,788,433 A | 11/1988 | Wright .................... 250/474.1 |
| 4,789,637 A | 12/1988 | Preziosi et al. ................. 436/2 |
| 4,829,187 A * | 5/1989 | Tomita et al. ............ 250/474.1 |
| 4,916,211 A | 4/1990 | Rubner ....................... 528/480 |
| 4,918,317 A | 4/1990 | Hess et al. ............... 250/474.1 |
| 4,957,851 A | 9/1990 | Tomida et al. .............. 430/272 |
| 4,985,632 A | 1/1991 | Bianco et al. .............. 250/372 |
| 5,028,792 A | 7/1991 | Mullis .................... 250/474.1 |
| 5,051,597 A | 9/1991 | Lewis et al. ............. 250/474.1 |
| 5,084,623 A | 1/1992 | Lewis et al. ............. 250/474.1 |
| 5,085,801 A | 2/1992 | Thierry et al. ........... 252/408.1 |
| 5,099,132 A * | 3/1992 | Ueno et al. .............. 250/474.1 |
| 5,117,116 A | 5/1992 | Bannard et al. .......... 250/474.1 |
| 5,149,617 A | 9/1992 | Liu ........................... 430/346 |
| 5,324,548 A | 6/1994 | Ogawa et al. .............. 427/492 |
| 5,359,200 A | 10/1994 | Donahue et al. ......... 250/475.2 |
| 5,420,000 A | 5/1995 | Patel .......................... 430/332 |
| 5,436,115 A | 7/1995 | Mullis ........................ 430/338 |
| 5,451,792 A | 9/1995 | Maguire et al. ......... 250/474.1 |
| 6,060,321 A * | 5/2000 | Hovorka ...................... 436/57 |

* cited by examiner

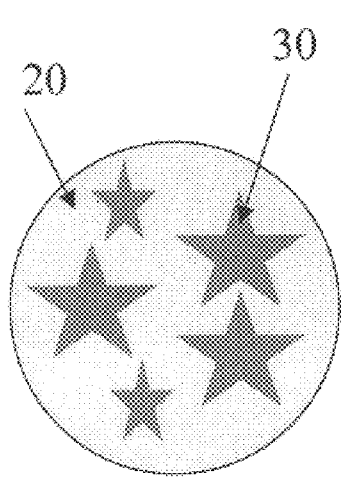
Figure 1a
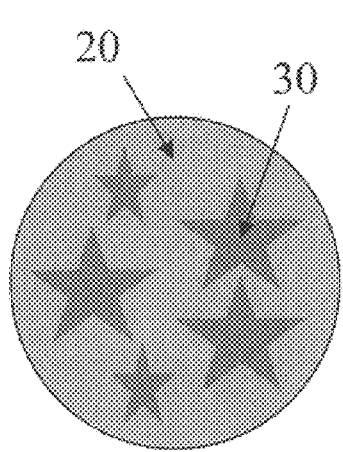
Figure 1b
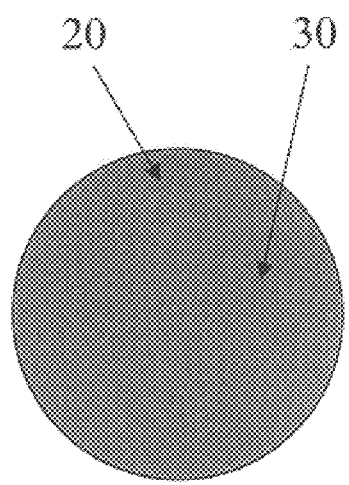
Figure 1c
Figure 2
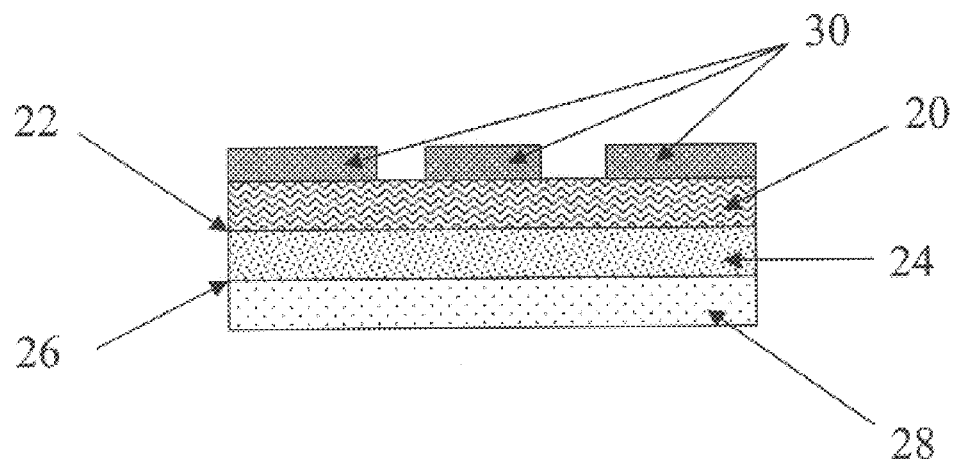

RADIATION INDICATOR DEVICE

TECHNICAL FIELD

A radiation indicator device which provides a visually recognizable indication of exposure to ultraviolet radiation.

BACKGROUND OF THE INVENTION

Sunlight is normally divided into infrared energy, visible light, and ultraviolet light. Infrared energy consists of the portion of the solar spectrum, with wavelength above 760 nanometers. Visible light is defined as radiation with a wavelength between 400 and 760 nanometers. Ultraviolet light consists of radiation with a wavelength below 400 nanometers. Infrared energy is our main source of warmth. Sunlight supplies energy necessary for photosynthesis in living plants. In fact, it is essential for all living things on earth.

In leisure time, some people like to bask in the sun to get a healthy looking tan. Many people like to enjoy months of uninhibited sunshine exposure while participating in other outdoor activities. However, research has found that increased exposure to ultraviolet rays from the sun causes skin cancer, cataracts in human eyes, sunburn, skin wrinkling, possible immune system damage, and leathery skin. It also causes cacti to shrivel, cattle and sheep to develop conjunctivitis, eucalyptus trees to turn yellow, frog population to decline, and fish population to decrease. Humans are among the living beings most vulnerable to the constant shower of ultraviolet radiation. Unprotected by scales or feathers, we face a rising threat of illness related to sunlight exposure. The new health hazard is challenging our desire to spend time outdoors. The incidence of skin cancer has been on the rise steadily for the last 20 years and this disease has become one of the leading causes of death today. One in six Americans might develop skin cancer in their lifetime because sun damage to the skin is cumulative.

Hovering six to 25 miles above the earth, the stratospheric ozone layer is our natural sunscreen, protecting us from some of the sun's harmful rays. Atmospheric scientists at National Aeronautics and Space Administration have used satellites to study the depletion of ozone in the upper atmosphere. There is evidence that a severe depletion of the ozone layer has occurred over the Antarctic, resulting in an ozone hole of about 9 million square miles in 1994 (about 2.5 times the size of the United States of America). The hole in the ozone layer is caused by chlorofluorocarbons (CFCs) which are commonly used as refrigerant and propellant in aerosol sprays. The CFCs undergo a series of chemical reactions in the atmosphere, leading to the production of chlorine monoxide that consumes ozone. Levels of ozone destroying chlorine monoxide in Antarctic are extremely high by August and as a result the ozone shield is destroyed allowing damaging solar ultraviolet radiation to reach the earth's surface. Although the thinning of the ozone layer is most severe over Antarctica, it has been observed as a global phenomenon at all latitudes. According to a report of the United Nations, during the last decade the annual dose of harmful ultraviolet light striking the Northern Hemisphere rose by about five percent.

The solar ultraviolet spectrum is generally considered to consist of wavelengths between 100 and 400 nanometers and the International Commission on Illumination further subdivides this portion of the solar spectrum into UV-A, UV-B and UV-C rays.

UV-A rays have the longest wavelength in the range of between about 400 nanometers and about 315 nanometers and these rays penetrate the skin the deepest. UV-A light is also the most difficult to screen out. These wavelengths of ultraviolet radiation pass readily through the atmosphere and maintain their intensity throughout the day regardless of the position of the sun above the horizon. Heavy clouds can filter this radiation but many traditional sunscreen formulations do not adequately protect against UV-A exposure.

UV-B rays are in the wavelength region of between about 315 nanometers and about 280 nanometers. Although ozone and clouds screen out some of them, many of them do reach the earth. UV-B light is responsible for wrinkling, breaking down the elastic tissue and collagen, and sunburn. UV-B light is probably 100 times more carcinogenic than UV-A light. It causes three types of skin cancer-basal cell cancer, squamous cell cancer, and melanoma. Skin cancers have skyrocketed in the last 20 years, coinciding with our increased outdoor activities and with the depletion of the ozone layer. UV-B light is in large part responsible for the tough leathery look of human skin following prolonged outdoor weathering. However, when the ozone layer is thick enough to function properly, it shields us from most UV-B rays.

UV-C rays have the shortest wavelength of between about 280 nanometers and about 100 nanometers. These rays are the most dangerous ultraviolet radiation but they are filtered out by the atmosphere and do not reach the surface of the earth.

In the United States, the National Weather Service, urged by the Environmental Protection Agency, the Centers for Disease Control, and the American Cancer Society, has begun a new index of UV radiation to warn people against overexposure to the sun. This Ultraviolet Potential Index is based on atmospheric changes and has a scale from 0 to 15. The higher the number, the higher the risk to skin cancer and the faster that outdoor enthusiast will burn. To predict the Ultraviolet Potential Index, the National Weather Service uses satellites and ground equipment to compute the UV levels through a combination of readings from forecasted cloud cover, temperatures, and local ozone amounts. The more ozone present at a location, the less radiation will reach the earth's surface at that area. A rating of 7 means that fair-skinned people should stay out of the sun or risk sunburn and other skin damage associated with high UV exposure.

The new Ultraviolet Potential Index measures potential exposure in five levels according to the National Weather Service and the American Cancer Society:

0 to 2: Minimal risk of ultraviolet radiation; could be in sun unprotected for more than an hour without skin burning;

3 to 4: Low risk; could be in the sun unprotected for 30 minutes to an hour;

5 to 6: Moderate risk; could be in sun unprotected for 20 to 30 minutes;

7 to 9: High risk of skin damage at 13 minutes;

10 to 15: Very-high risk of skin damage occurs at less than 13 minutes.

Although an effective method of defining the risk associated with sun exposure, the Ultraviolet Potential Index has a variety of limitations as a method to protect the population from skin damage due to ultraviolet radiation. As of July 1994, only 85 cities in the United States were given the predicted Ultraviolet Potential Index on a trial basis. It would be very difficult to include all parts of the nation. These predicted index numbers could only serve as general guidelines since the local cloud cover might move away or become thick because weather conditions are unpredictable. Thus, there is a need for a device to be used in situ that would indicate ultraviolet radiation levels and consequently warn outdoor enthusiasts against overexposure to the sunlight anywhere and at any time.

To reduce the ultraviolet radiation exposure to the skin it is advisable to apply sunscreen having a Sun Protection Factor (SPF) of at least 15 and above. The sunscreen contains ultraviolet light absorbers, which are designed to remove part or most of the harmful ultraviolet rays. By applying the sunscreen on the skin, one might mistakenly believe that the skin will not be damaged by the ultraviolet light. In fact, the sunscreen does not completely block all UV-A and UV-B rays in the sunlight. The skin has no natural sensors to ultraviolet radiation exposure other than the delayed and painful effect of skin erythema or "sunburn" which follows excessive exposure.

Various systems and devices have been proposed for monitoring exposure to ultraviolet radiation, such as those disclosed in U.S. Pat. No. 3,449,572 (Sylvester et al) U.S. Pat. No. 3,787,687 (Trumble), U.S. Pat. No. 3,903,423 (Zweig), U.S. Pat. No. 4,130,760 (Fanselow et al), U.S. Pat. No. 4,308,459 (Williams), U.S. Pat. No. 4,788,433 (Wright), U.S. Pat. No. 4,829,187 (Tomita et al), U.S. Pat. No. 4,985,632 (Bianco et al), U.S. Pat. No. 5,028,792 (Mullis) and U.S. Pat. No. 5,117,116 (Bannard et al).

However, many of these systems and devices have various drawbacks including use of cumbersome mechanical devices, use of carcinogenic compounds for indicating exposure by colour indication, or the like. In addition, some devices have limited utility if they do not respond predominantly to the UV-B part of the solar spectrum. Devices which respond to both UV-A and UV-B could give misleading indications of potential harm.

Other systems and devices have been proposed generally for indicating exposure to radiation, including U.S. Pat. No. 3,051,837 (Nitka), U.S. Pat. No. 3,290,499 (Vale et al), U.S. Pat. No. 3,691,380 (Hubner et al), U.S. Pat. No. 3,743,846 (Matsumoto et al), U.S. Pat. No. 3,899,677 (Hori et al), U.S. Pat. No. 4,008,085 (Lemahieu et al), U.S. Pat. No. 5,051,597 (Lewis et al), U.S. Pat. No. 5,084,623 (Lewis et al) and U.S. Pat. No. 5,099,132 (Ueno et al).

Many of these systems and devices are directed at the indication of radiation outside the ultraviolet range or are directed at photographic processes rather than the indication of radiation.

There is therefore a need in the art of radiation indicators for an indicator device which provides a visually recognizable indication of ultraviolet radiation exposure, particularly ultraviolet radiation exposure which is potentially harmful to human skin.

SUMMARY OF THE INVENTION

The present invention relates to a device for indicating exposure to ultraviolet radiation, which device is inexpensive, disposable and is self-contained, requiring no other device or indicator in order to ascertain radiation exposure levels.

The invention is a radiation indicator device which is comprised of a radiation sensitive mixture which undergoes a colour change which is visually recognizable when exposed to ultraviolet radiation. The device may also comprise a graphic pattern interspersed amongst the radiation sensitive mixture, which graphic pattern provides a reference for quantifying the amount of radiation exposure.

In a first aspect, the invention is a radiation indicator device for use in indicating exposure to ultraviolet-B radiation, the indicator device comprising:

(a) a radiation sensitive mixture selectively responsive to ultraviolet radiation having a wavelength substantially within or shorter than the range of wavelengths of ultraviolet-B radiation, the radiation sensitive mixture being comprised of:
  (i) an amount of an organic halogen constituent capable of producing at least one acidic product upon exposure to ultraviolet radiation; and
  (ii) an amount of an indicator constituent capable of producing a change in colour in response to a change in concentration of the acidic product, so that the radiation sensitive mixture has a first colour representing a relatively low concentration of the acidic product and has a second colour representing a relatively high concentration of the acidic product; and (b) a graphic pattern interspersed amongst the radiation sensitive mixture, the graphic pattern having a graphic pattern colour substantially identical to one of the first colour and the second colour of the radiation sensitive mixture, the graphic pattern being visually distinguishable from the radiation sensitive mixture when the indicator constituent is not at the other of the first colour and the second colour.

The graphic pattern colour is preferably substantially identical to the second colour of the radiation sensitive mixture so that the graphic pattern becomes less visually distinguishable as the radiation sensitive mixture approaches the second colour. The graphic pattern colour may however be substantially identical to the initial colour so that the graphic pattern becomes more visually distinguishable as the radiation sensitive mixture approaches the second colour.

In a second aspect, the invention is an indicator device for use in indicating exposure to ultraviolet-B radiation, the indicator device comprising a radiation sensitive mixture selectively responsive to ultraviolet radiation having a wavelength substantially within or shorter than the range of wavelengths of ultraviolet-B radiation, the radiation sensitive mixture being comprised of:

(a) an amount of an organic halogen constituent capable of producing at least one acidic product upon exposure to ultraviolet radiation; and (b) an amount of an indicator constituent capable of producing a change in colour in response to a change in concentration of the acidic product, so that the radiation sensitive mixture has a first colour representing a relatively low concentration of the acidic product and has a second colour representing a relatively high concentration of the acidic product, wherein the first colour is visually distinguishable from the second colour.

The first colour may be visually distinguishable from the second colour in any manner. For example, the first colour may be a completely different colour than the second colour or the first colour and the second colour may be significantly different hues of the same colour.

The organic halogen constituent may be comprised of any organic halogen compound or compounds including substituted organic compounds which are capable of producing the acidic product upon exposure to ultraviolet radiation.

Preferably the organic halogen constituent is selectively responsive to exposure to ultraviolet radiation having a wavelength substantially within or shorter than the range of wavelengths of ultraviolet-B radiation. Alternatively or additionally, the radiation sensitive mixture may be comprised of a screen or a screening agent for inhibiting the exposure of the organic halogen constituent to radiation other than radiation having a wavelength substantially within or shorter than the range of wavelengths of ultraviolet-B radiation. Preferably the selectivity of the radiation sensitive mixture is substantial so that the responsiveness of the radiation sensitive mixture to radiation other than radiation having a wavelength substantially within or shorter than the range of wavelengths of ultraviolet-B radiation is minimized.

Although not essential to the invention, the radiation sensitive mixture may be designed also to inhibit its responsiveness to radiation having a wavelength shorter than the range of wavelengths of ultraviolet-B radiation in order to minimize potential responsiveness to ultraviolet-C radiation.

The organic halogen constituent is preferably a relatively stable substance or substances. In addition, the organic halogen constituent is preferably relatively inexpensive and is either commercially available or is relatively easy to produce. The organic halogen constituent is therefore preferably a relatively simple substance both chemically and structurally.

As a result, preferably the organic halogen constituent is comprised of an aliphatic halogen compound comprising between one and five carbon atoms and one or more halogen atoms, an aromatic halogen compound comprising one or two aromatic rings and one or more halogen atoms, or a cyclic aliphatic halogen compound comprising one or more halogen atoms. The organic halogen constituent may be comprised of one or more than one compound. The halogen atoms are preferably chlorine, bromine or iodine. The cyclic aliphatic halogen compounds may be comprised of adamantanes.

Preferably, the organic halogen constituent is comprised of a compound selected from the group of compounds consisting of carbon tetrabromide, iodoform, chloral, bromal, 2,2,2-tribromoethanol, 1,2-dibromotetrachloroethane, hexachloroethane, trichloroacetic acid, a sodium salt of trichloroacetic acid, phenyl tribromomethylsulfone, phenyl trichloromethylsulfone, 1,2,4,5-tetrabromobenzene, 1-bromoadamantane, 1,3-dibromoadamantane, 2-bromoadamantane and 1-iodoadamantane. More preferably the organic halogen constituent is comprised of a compound selected from the group of compounds consisting of carbon tetrabromide, bromal, 1,2-dibromotetrachloroethane, hexachloroethane, 1,2,4,5-tetrabromobenzene, 1,3-dibromoadamantane and 1-iodoadamantane. Most preferably the organic halogen constituent is comprised of a compound selected from the group of compounds consisting of 1,2-dibromotetrachloroethane, hexachloroethane, 1,2,4,5-tetrabromobenzene and 1-iodoadamantane.

The indicator device may be provided in any form. Preferably the indicator device is further comprised of a support having an indicator surface, wherein the radiation sensitive mixture is carried as a mixture layer on the indicator surface and wherein the graphic pattern is carried as a graphic layer on the indicator surface.

The graphic pattern may be comprised of an illustration, text, or both illustration and text. The illustration may depict an object or may comprise a design, including an abstract design.

The graphic pattern may overlay the radiation sensitive mixture or the radiation sensitive mixture may overlay the graphic pattern so that one of the graphic layer and the mixture layer is carried directly on the indicator surface and the other of the graphic layer and the mixture layer is carried indirectly on the indicator surface. Alternatively, both the graphic layer and the mixture layer may be carried directly on the indicator surface by providing gaps in the mixture layer. In the preferred embodiment, the graphic layer comprising the graphic pattern overlays the mixture layer comprising the radiation sensitive mixture so that the mixture layer is carried directly by the indicator surface and the graphic layer is carried indirectly by the indicator surface.

In the first aspect, the indicator constituent is selected so that the graphic pattern will be visually distinguishable when the radiation sensitive mixture is at either the first colour or the second colour. In the second aspect, the indicator constituent is selected so that the first colour is visually distinguishable from the second colour.

Any compound capable of producing a change in colour in response to a change in concentration of the acidic product and which meets the above criteria may be used as the indicator constituent. For example, the indicator constituent may be comprised of one or more compounds listed in the Sigma-Aldrich Handbook of Stains, Dyes and Indicators (Aldrich Chemical Company, Inc., Milwaukee, Wis., 1990). Representative examples include methyl orange, methyl red, aniline blue, methylene blue, congo red, methyl yellow, phenol red, phenolphthalein, bromocresol purple, chlorophenol red, ethyl orange, bromocresol green, and bromochlorophenol blue. Methyl orange and methyl yellow are among the preferred compounds which may be used as the indicator constituent. In the preferred embodiment the indicator constituent is comprised of methyl orange.

The radiation sensitive mixture is preferably further comprised of an amount of a binder for providing a matrix for the organic halogen constituent and the indicator constituent. The binder may be comprised of any compound which will provide the matrix without interfering significantly with the production of the acidic product, the change in colour of the indicator constituent or the selectivity of the radiation sensitive mixture.

Preferably the binder is comprised of an organic polymer or an organic copolymer. In the preferred embodiment the binder is comprised of polyvinyl chloride or one of the Geon™ copolymers such as Geon™ 136. Other organic polymers and copolymers such as for example polymers of cellulose derivatives, vinyls, acrylics and carbonates may however be used.

The radiation sensitive mixture may be formed by combining the organic halogen constituent, the indicator constituent and the binder. Preferably however the binder is dissolved or dispersed in an amount of a solvent to assist in the formation of the matrix of the radiation sensitive mixture. Preferably the solvent evaporates following preparation of the radiation sensitive mixture. Many substances may be effective as solvents for the binder, as long as they do not interfere significantly with the production of the acidic product, the change in colour of the indicator constituent or the selectivity of the radiation sensitive mixture. Preferably the solvent is comprised of tetrahydrofuran, acetone, 2-butanone, toluene, 1,4-dioxane, methylene chloride, chloroform, isopropanol, methanol or ethanol. In the preferred embodiment the solvent is comprised of tetrahydrofuran or tetrahydrofuran mixed with some other solvent such as acetone.

The radiation sensitive mixture may be further comprised of an amount of a surfactant for enhancing the dispersion of the indicator constituent in the binder. Many substances may be effective as surfactants as long as they do not interfere significantly with the production of the acidic product, the change in colour of the indicator constituent or the selectivity of the radiation sensitive mixture. Preferably the surfactant is comprised of Triton™ X-100, reduced Triton™

X-100, Niaproof™ Type 4 or Tween™ 20. Most preferably the surfactant is comprised of Triton™ X-100.

The radiation sensitive mixture may be further comprised of an amount of a suppressing agent for suppressing an increase in concentration of the acidic product. Many substances may be effective as suppressing agents as long as they do not interfere significantly with the production of the acidic product, the change in colour of the indicator constituent or the selectivity of the radiation sensitive mixture. The suppressing agent is preferably comprised of a base, a buffer or a mixture thereof. Most preferably the suppressing agent is comprised of sodium maleate, zinc stearate, diphenylamine or related amines, a phosphate or a borate.

The radiation sensitive mixture may be further comprised of an amount of a promoter for enhancing an increase in concentration of the acidic product. Many substances may be effective as promoters as long as they do not interfere significantly with the production of the acidic product, the change in colour of the indicator constituent or the selectivity of the radiation sensitive mixture. The promoter is preferably comprised of an amine or other suitable nitrogen containing compound, such as a quaternary nitrogen compound. Most preferably the promoter is comprised of tetrabutylammonium iodide or diphenylamine.

The selectivity of the radiation indicator may be provided or may be enhanced by being further comprised of a screen or a screening agent for inhibiting exposure of the radiation sensitive mixture to radiation other than ultraviolet-B radiation. The screen may be comprised of a screening layer which overlays the mixture layer. Many substances may be effective as screening agents as long as they do not interfere significantly with the production of the acidic product or with the change in colour of the indicator constituent. The screening agent is preferably comprised of a compound such as Parsol™ (4-(1,1-Dimethylethyl)-4'-methoxydibenzoylmethane), phorone, menthyl anthranilate, 2-hydroxy-4-methoxybenzophenone, 2,2-dihydroxy-4-methoxybenzophenone or 2-aminobenzophenone.

Finally, the radiation sensitive mixture may be further comprised of an amount of a plasticizer for enhancing the properties of the binder. Many substances may be effective as plasticizers as long as they do not interfere significantly with the production of the acidic product, the change in colour of the indicator constituent or the selectivity of the radiation sensitive mixture. The plasticizer is preferably comprised of dibutyl phthalate, dioctyl phthalate, trioctyl trimellitate, epoxydized soybean oil, triphenyl phosphate or 1,2-epoxydodecane.

The constituents of the indicator device and their concentrations may be selected in order to achieve a desired response to exposure to ultraviolet-B radiation. The concentrations of the organic halogen constituent and the indicator constituent may facilitate control over the specific hues of the first colour and the second colour as well as over the amount of radiation which is necessary to change the radiation sensitive mixture from the first colour to the second colour. In addition, the use of a screen or screening agent can provide or enhance the selectivity of the indicator device with respect to ultraviolet-B radiation. Finally, the use of a suppressing agent and/or a promoter and control over their amounts may facilitate custom designing of the device for different skin types.

BRIEF DESCRIPTION OF DRAWINGS

Embodiments of the invention will now be described with reference to the accompanying drawings, in which:

FIG. 1(a), FIG. 1(b) and FIG. 1(c) is a graphical representation according to a preferred embodiment of the invention of the transition of the indicator constituent from the first colour to the second colour, with FIG. 1(a) depicting the indicator device with the indicator constituent at the first colour, FIG. 1(c) depicting the indicator device with the indicator constituent at the second colour and FIG. 1(b) depicting the indicator device with the indicator constituent at a colour between the first colour and the second colour.

FIG. 2 is a schematic cross-section of an indicator device according to a preferred embodiment of the invention.

DETAILED DESCRIPTION

According to a preferred embodiment of the present invention and referring to FIG. 2, a mixture layer (20) consisting of a matrix of a radiation sensitive mixture is applied to an indicator surface (22) on a support (24). The radiation sensitive mixture is comprised of an organic halogen constituent, an indicator constituent and a binder. In the preferred embodiment, the radiation sensitive mixture is prepared by dissolving or dispersing the binder in a solvent and the radiation sensitive mixture is further comprised of a surfactant for enhancing the dispersability of the indicator constituent in the binder. The support (24) has a second surface (26) opposite the indicator surface (22) which is provided with an adhesive (28) which is suitable for attachment to skin, clothing or other surfaces in conjunction with which the device is intended to be used.

A graphic layer (30) is also applied indirectly to the indicator surface (22) by being overlaid on the mixture layer (20). Alternatively, the graphic layer (30) may be applied directly to the indicator surface (22) and the mixture layer (20) may be overlaid over the graphic layer (30), or both the graphic layer (30) and the mixture layer (20) may be applied directly to the indicator surface (22) by creating gaps in the mixture layer (20). The graphic pattern may include illustrations, text or both. Preferably the graphic pattern is visually appealing to users of the radiation indicator device. The graphic pattern may be constructed of any material which is compatible with the support and which is capable of maintaining its colour.

The organic halogen constituent is capable of producing at least one acidic product upon exposure to ultraviolet radiation. The indicator constituent is capable of producing a change in colour in response to a change in the concentration of the acidic product. As a result, the radiation sensitive mixture will undergo a colour change within a colour range in response to exposure to ultraviolet radiation. Within this range, a first colour represents a relatively low concentration of the acidic product while a second colour represents a relatively high concentration of the acidic product. The first colour and the second colour may represent the endpoints of the colour range or one or both of the first colour and the second colour may represent intermediate colours within the range. The colour range may include different colours, different hues of one or more colours or a combination of different colours and different hues. The first colour and the second colour may be selected so as to represent a desired or predetermined amount of radiation exposure between them.

The indicator constituent and the graphic pattern are preferably selected so that the colour of the graphic pastern is matched to either the first colour or the second colour exhibited by the radiation sensitive mixture and so that the graphic pattern is visually distinguishable when the colour of the graphic pattern is not so matched.

Any compound capable of producing a change in colour in response to a change in concentration of the acidic product and which meets the above criteria may be used as the indicator constituent including but not limited to methyl orange, methyl red, aniline blue, methylene blue, congo red, methyl yellow, phenol red, phenolphthalein, bromocresol purple, chlorophenol red, ethyl orange, bromocresol green, and bromochlorophenol blue. Methyl orange and methyl yellow are among the preferred compounds which may be used as the indicator constituent. In the preferred embodiment the indicator constituent is comprised of methyl orange.

The graphic pattern may be comprised of any material which can be carried directly or indirectly on the indicator surface (22) and which is capable of maintaining colour.

In the preferred embodiment, the graphic pattern on the graphic layer (30) is printed in a colour that will substantially match the second colour so that the graphic pattern becomes less visually distinguishable as the radiation sensitive mixture is exposed to more ultraviolet radiation and its colour moves toward the second colour.

The radiation sensitive mixture is designed to be selectively responsive to ultraviolet radiation having a wavelength substantially within or shorter than the range of wavelengths of ultraviolet-B radiation. In other words, the radiation indicator device is designed not to be significantly responsive to ultraviolet-A radiation. The radiation indicator device may, however, be responsive to ultraviolet-C radiation since most if not all of this form of ultraviolet radiation is filtered by the atmosphere and is therefore not present at the earth's surface in significant amounts.

The selectivity of the radiation indicator device is preferably as high as possible since higher selectivity will result in a more accurate indication of exposure to ultraviolet-B radiation. The degree of selectivity of the radiation indicator device will depend primarily upon the manner in which selectivity is achieved and upon the properties of the organic halogen constituent. In this application, the terms "selectively" and "selectivity" refer to some degree of selectivity and not necessarily absolute selectivity.

The selectivity of the radiation indicator device may be achieved either by selecting an organic halogen constituent which produces the acidic product selectively in response to exposure to radiation having a wavelength substantially within or shorter than the range of wavelengths of ultraviolet-B radiation or by providing the radiation sensitive mixture with a screen or a screening agent to inhibit the exposure of the radiation sensitive mixture to radiation other than radiation having a wavelength substantially within or shorter than the range of wavelengths of ultraviolet-B radiation. A screen is any device or substance which can perform a screening function and could be included as an external layer of the radiation sensitive mixture. A screening agent is a substance which can perform a screening function and which may be mixed with the other ingredients of the radiation sensitive mixture.

If the selectivity of the radiation sensitive mixture is dependent upon a screen or screening agent, then any organic halogen constituent which is capable of producing the acidic product may be used in the invention, since selectivity of the organic halogen constituent is not in such circumstances essential.

In the preferred embodiment, however, the organic halogen constituent is chosen so that it produces the acidic product selectively upon exposure to radiation having a wavelength substantially within or shorter than the range of wavelengths of ultraviolet-B radiation, thus reducing or eliminating the need for a screen or a screening agent.

Preferred selective organic halogen constituents may include a wide range of aliphatic, aromatic and cyclic aliphatic organic compounds, but will be a smaller group of compounds than those that may be appropriate if the selectivity of the radiation sensitive mixture is dependent upon a screen or screening agent.

A preferred class of selective organic halogen constituents includes aliphatic halogen compounds comprising between one and five carbon atoms and one or more halogen atoms, aromatic halogen compounds comprising one or two aromatic rings and one or more halogen atoms, and cyclic aliphatic halogen compounds comprising one or more halogen atoms.

Preferred selective organic halogen constituents within this class include carbon tetrabromnide, iodoform, chloral, bromal, 2,2,2-tribromoethanol, 1,2-dibromotetrachloroethane, hexachloroethane, trichloroacetic acid, a sodium salt of trichloroacetic acid, phenyl tribromomethylsulfone, phenyl trichloromethylsulfone, 1,2,4,5-tetrabromobenzene, 1-bromoadamantane, 1,3-dibromoadamantane, 2-bromoadamantane and 1-iodoadamantane. Even more preferred selective organic halogen constituents within this class include carbon tetrabromide, bromal, 1,2-dibromotetrachloroethane, hexachloroethane, 1,2,4,5-tetrabromobenzene, 1,3-dibromoadamantane and 1-iodoadamantane. The most preferred selective organic halogen constituents within this class include 1,2-dibromotetrachloroethane, hexachloroethane, 1,2,4,5-tetrabromobenzene and 1-iodoadamantane. The organic halogen constituent may comprise one or more compounds.

Referring to FIG. 1, FIG. 1(a) depicts a representation of a radiation indicator device of the preferred embodiment wherein the radiation sensitive mixture is at the first colour and wherein the graphic pattern is clearly visually distinguishable. FIG. 1(b) depicts the radiation indicator device at an intermediate condition following exposure to ultraviolet radiation wherein the radiation sensitive mixture is at a colour between the first colour and the second colour and wherein the graphic pattern remains visually distinguishable. FIG. 1(c) depicts the radiation indicator device following further exposure to ultraviolet radiation wherein the radiation sensitive mixture is at the second colour and wherein the graphic pattern is not visually distinguishable. This configuration allows a user of the radiation indicator device to self-monitor radiation exposure without the need for any external references or external evaluation of the radiation indicator device.

A second preferred embodiment of the invention relates to visually dramatic radiation indicator devices which can be attached to skin, clothing or other surfaces and can be readily monitored from a distance as might be required if a parent wishes to monitor a child's exposure during play or other outdoor activities. These devices change colour in response to exposure to ultraviolet-B radiation from a "safe" first colour to a "dangerous" second colour, which first colour and second colour are visually distinguishable. The second embodiment of the invention is essentially the same as the first embodiment except that the second embodiment does not include the graphic pattern and thus relies upon the ability to distinguish visually between the first colour and the second colour in order to provide an indication of radiation exposure which does not require external references or external evaluation of the radiation indicator device.

The following description and examples will illustrate some of the preferred formulations of radiation sensitive mixture which can be incorporated into any of the preferred embodiments of the invention.

The radiation sensitive mixture preferably comprises a matrix comprising a mixture of a plastic or polymer binder, an organic halogen constituent comprising an acid releasing organic halogen compound and an indicator constituent comprising one or more indicator dyes which change colour in response to the change in concentration of acid equivalents in the matrix. The generation of colour change in the dyes results after ultraviolet radiation within a certain wavelength releases acid equivalents from the organic halogen compound. The device is preferably substantially insensitive to visible light and elevated temperatures. The radiation sensitive mixture may be prepared as a film or thin coating which can then be placed on the indicator surface (22) on the support (24) according to the preferred embodiments.

The creation of the radiation sensitive layer may also involve the use of additives which are used to improve the solubility characteristics of the ingredients or to enhance the properties of the radiation sensitive layer.

One such additive is a solvent used to enhance the ability of the organic halogen constituent and the indicator constituent to mix with the binder. Examples of such solvents are tetrahydrofuran, acetone, 2-butanone, toluene, 1,4-dioxane, methylene chloride, chloroform, isopropanol, methanol or ethanol. The solvent will preferably evaporate following preparation of the radiation sensitive mixture.

A second such additive is a surfactant used to enhance the solubility of dyes in the solutions used. Examples of such surfactants are Triton™ X-100, reduced Triton™ X-100, Niaproof™ Type 4, Tween™ 20 and a variety of related detergents and wetting agents commercially available. The preferred surfactants for the present invention are the Triton-X™ reagents such as Triton™ X-100 although other surfactants will be suitable.

A third such additive is a plasticizer such as dibutyl phthalate, dioctyl phthalate, trioctyl trimellitate, epoxidized soybean oil, triphenyl phosphate or 1,2-epoxydodecane.

A fourth such additive is a material designed as a colour stabilizer or enhancer. Agents of this sort are well known in the field of coloured polymer formation.

A fifth such additive is a promoter designed to promote or stabilize the release of acid equivalents from the halogen containing compounds. Examples of such additives are nitrogen containing compounds such as tetrabutylammonium iodide and amines such as diphenylamine.

A sixth such additive is a suppressing agent designed to suppress the concentration of acid equivalents released following ultraviolet exposure. Examples of such suppressing agents are buffers such as sodium maleate, zinc stearate, diphenylamine or related amines or biological buffers such as phosphate or borate. Additional suppressers include inorganic bases such as sodium, calcium, magnesium or other metal hydroxides, carbonates and bicarbonates and organic bases.

A seventh such additive is a screen or screening agent designed to selectively screen out particular wavelengths of the ultraviolet spectrum. This could include screening agents known to selectively screen ultraviolet-A radiation such as Parsol™ (4-(1,1-Dimethylethyl)-4'-methoxydibenzoylmethane) or related agents such as phorone, menthyl anthranilate, 2-hydroxy-4-methoxybenzophenone, 2,2-dihydroxy-4-methoxybenzophenone or 2-amino-benzophenone.

Preferably the radiation sensitive mixture is created using some or all of the following ingredients:

(a) between about 50 and about 99 weight percent of a binder such as polyvinyl chloride;
(b) between about 0.01 and about 10 weight percent of an indicator constituent such as methyl orange or methyl yellow;
(c) between about 0.01 and about 10 weight percent of an organic halogen constituent such as carbon tetrabromide, iodoform, chloral, bromal, 2,2,2-tribromoethanol, 1,2-dibromotetrachloroethane, hexachloroethane, trichloroacetic acid, a sodium salt of trichloroacetic acid, phenyl tribromomethylsulfone, phenyl trichloromethylsulfone, 1,2,4,5-tetrabromobenzene, 1-bromoadamantane, 1,3-dibromoadamantane, 2-bromoadamantane and 1-iodoadamantane;
(d) between about 0.1 and about 25 weight percent of a surfactant such as Triton™ X-100;
(e) between about 0.00 and about 10 weight percent of a plasticizer such as dibutyl phthalate, dioctyl phthalate, trioctyl trimellitate, epoxidized soybean oil, triphenyl phosphate or 1,2-epoxydodecane;
(f) between about 0.00 and about 10 weight percent of a colour enhancer of the type known in the art;
(g) between about 0.00 and about 10 weight percent of a promoter such as tetrabutylammonium iodide or diphenylarnine;
(h) between about 0.00 and about 10 weight percent of a suppressing agent such as a base or a buffer; and
(i) between about 0.00 and about 2 weight percent of a screening agent such as such as Parsol™ (4-(1,1-Dimethylethyl)-4'-methoxydibenzoylmethane), phorone, menthyl anthraniate, 2-hydroxy-4-methoxybenzophenone, 2,2-dihydroxy-4-methoxybenzophenone or 2-amino-benzophenone.

In the preferred embodiment, the radiation sensitive mixture is created using the following ingredients:

(a) between about 75 and about 90, preferably about 83 weight percent polyvinyl chloride or polyvinyl chloride and Geon™ 136 as a binder;
(b) between about 0.1 and about 0.5, preferably about 0.35 weight percent of methyl orange as an indicator constituent;
(c) between about 0.2 and about 20 weight percent of 1,2-dibromotetrachloroethane, hexachloroethane, 1-iodoadamantane or 2,4,5-tetrabromobenzene as an organic halogen constituent;
(d) between about 1 and about 20, preferably about 3 weight percent of Triton™ X-100 as a surfactant.

The percentages above refer to the formulations after their preparation as dried thin films. In the preferred embodiment, each preparation is made using a solvent or solvents, as detailed in the following examples, in order to form homogenous mixtures with appropriate properties for printing or other manufacturing processes. Evaporation of the solvents leads to thin films with the composition described above. The amount of solvent required for the creation of the radiation sensitive mixture will depend upon the properties of the binder, the indicator constituent and the organic halogen constituent, but is preferably minimized. In the preferred embodiment the amount of solvent is between about 70 and about 95 weight percent.

The following examples illustrate the design and preparation of radiation sensitive mixtures according to the preferred embodiments of the invention in which the organic halogen constituent is chosen to have some degree of selectivity of response to exposure to ultraviolet-B radiation.

In the Examples, various radiation sensitive mixtures are detailed having varying sensitivity to ultraviolet radiation generally and having some sensitivity to the more damaging ultraviolet-B range.

EXAMPLES

Example 1

| (a) Binder: | 170 g |
|---|---|
| polyvinyl chloride- | |
| (b) Indicator Constituent: | 0.68 g |
| methyl orange- | |
| (c) Organic Halogen Constituent: | 1.136 g |
| 1,2-dibromotetrachloroethane- | |
| (d) Surfactant: | 33.6 g |
| Triton ™ X-100- | |
| (e) Solvent: | 1020 ml |
| tetrahydrofuran- | |

The above listed components were mixed to form opalescent yellow solution of medium viscosity and then applied to support surfaces such as paper or plastic film to give dry coating thickness 2.5 mil (63.5 μm).

The procedure used in Example 1 was repeated for Examples 2–6 substituting successively, carbon tetrabromide, 1-iodoadamantane, 1,3-dibromoadamantane, 1,2,4,5-tetrabromobenzene and bromal in place of 1,2-dibromotetrachloroethane as the organic halogen constituent.

Example 2

| (a) Binder: | 170 g |
|---|---|
| polyvinyl chloride- | |
| (b) Indicator Constituent: | 0.68 g |
| methyl orange- | |
| (c) Organic Halogen Constituent: | 2.273 g |
| carbon tetrabromide- | |
| (d) Surfactant: | 33.6 g |
| Triton ™ X-100- | |
| (e) Solvent: | 1020 ml |
| tetrahydrofuran- | |

Example 3

| (a) Binder: | 170 g |
|---|---|
| polyvinyl chloride- | |
| (b) Indicator Constituent: | 0.68 g |
| methyl orange- | |
| (c) Organic Halogen Constituent: | 34.08 g |
| 1-iodoadamantane- | |
| (d) Surfactant: | 33.6 g |
| Triton ™ X-100- | |
| (e) Solvent: | 1020 ml |
| tetrahydrofuran- | |

Example 4

| (a) Binder: | 170 g |
|---|---|
| polyvinyl chloride- | |
| (b) Indicator Constituent: | 0.68 g |
| methyl orange- | |
| (c) Organic Halogen Constituent: | 34.08 g |
| 1,3-dibromoadamantane- | |
| (d) Surfactant: | 33.6 g |
| Triton ™ X-100- | |
| (e) Solvent: | 1020 ml |
| tetrahydrofuran- | |

Example 5

| (a) Binder: | 170 g |
|---|---|
| polyvinyl chloride- | |
| (b) Indicator Constituent: | 0.68 g |
| methyl orange- | |
| (c) Organic Halogen Constituent: | 11.36 g |
| 1,2,4,5-tetrabromobenzene- | |
| (d) Surfactant: | 33.6 g |
| Triton X ™ -100- | |
| (e) Solvent: | 1020 ml |
| tetrahydrofuran- | |

Example 6

| (a) Binder: | 170 g |
|---|---|
| polyvinyl chloride- | |
| (b) Indicator Constituent: | 0.68 g |
| methyl orange- | |
| (c) Organic Halogen Constituent: | 1.136 g |
| bromal- | |
| (d) Surfactant: | 33.6 g |
| Triton ™ X-100- | |
| (e) Solvent: | 1020 ml |
| tetrahydrofuran- | |

Example 7

The procedure of Example 1 was repeated using hexachloroethane as the organic halogen constituent in place of 1,2-dibromotetrachloroethane. In addition, the solvent tetrahydrofuran was partially substituted by acetone.

| (a) Binder: | 16 g |
|---|---|
| polyvinyl chloride- | |
| (b) Indicator Constituent: | 0.040 g |
| methyl orange- | |
| (c) Organic Halogen Constituent: | 1.222 g |
| hexachloroethane- | |
| (d) Surfactant: | 0.3254 g |
| Triton ™ X-100- | |
| (e) Solvent: | |
| tetrahydrofuran- | 26.38 g |
| acetone- | 78.28 g |

Example 8

The procedure used in Example 7 was repeated using Geon™ 136 instead of polyvinyl chloride as the binder. The solvent was tetrahydrofuran which was partially substituted by acetone.

| | | |
|---|---|---|
| (a) | Binder:<br>Geon ™ 136- | 4.02 g |
| (b) | Indicator Constituent:<br>methyl orange- | 0.0202 g |
| (c) | Organic Halogen Constituent:<br>hexachloroethane- | 0.01 g |
| (d) | Surfactant:<br>Triton ™ X-100- | 2.209 g |
| (e) | Solvent: | |
| | tetrahydrofuran- | 12.10 g |
| | acetone- | 30.0 g |

Optical Density Measurements and Visual Colour Changes

The radiation sensitive mixtures of Examples 1,2,3,5, and 7 were applied to paper strips and dried to give a coating thickness of 2.5 mil (63.5 µm). These samples were exposed to ultraviolet-B radiation from a calibrated ultraviolet-B lamp at a measured intensity equivalent to an Ultraviolet Potential Index of 10. Readings of optical density were taken at intervals over 1 hour and colour changes were recorded visually for these mixtures as well as the mixtures from Examples 4,6 and 8. The results of optical density readings are presented in Table 1 and observed colour change is presented in Table 3. An ideal mixture will show dramatic changes in optical density and a distinct visual colour change under these conditions. According to these criteria all the tested mixtures would be suitable ultraviolet-B radiation indicators.

A second series of exposures was performed on the above products using ultraviolet-A radiation from a ultraviolet-A lamp at an intensity equivalent to the ultraviolet-B exposures from above. Readings of optical density were taken at intervals over 1 hour and colour changes were recorded visually. The results of optical density readings are presented in Table 2 and observed visual colour change for the radiation sensitive mixtures of Examples 1,2,3,5 and 7 as well as the mixtures of Examples 4,6 and 8 is presented in Table 3. An ideal mixture will show little change in optical density and no visual change of colour under these conditions. According to these criteria all the tested samples would be suitable indicators with the possible exception of the mixture of Example 2 which also shows some sensitivity to ultraviolet-A radiation, thus suggesting the need for a screen or screening agent as a constituent of the radiation sensitive mixture where the organic halogen constituents is comprised of carbon tetrabromide.

A third series of exposures was performed on the mixtures of Examples 1–8 using standard laboratory lighting from fluorescent bulbs and a prolonged exposure time. Colour changes were recorded visually. Observed colour change is presented in Table 3. An ideal mixture will show no change in colour under these conditions. According to these criteria all the tested mixtures would be suitable ultraviolet-B indicators.

TABLE 1

Variations of optical density after exposure of the radiation sensitive mixtures to ultraviolet-B radiation over 1 hour at an Ultraviolet Potential Index of 10 (Lamp spectral output centered at 300 nm, UVB > 80%, 4.75 watts).

| Time | Optical Density Measurement | | | | |
|---|---|---|---|---|---|
| (min) | Example 1 | Example 2 | Example 3 | Example 5 | Example 7 |
| 0 | 0.20 | 0.19 | 0.23 | 0.20 | 0.15 |
| 10 | 0.43 | 0.45 | 0.37 | 0.32 | 0.48 |
| 20 | 0.51 | 0.59 | 0.48 | 0.47 | 0.55 |
| 30 | 0.56 | 0.66 | 0.58 | 0.53 | 0.64 |
| 40 | 0.64 | 0.73 | 0.61 | 0.56 | 0.66 |
| 60 | 0.69 | 0.85 | 0.67 | 0.64 | 0.70 |

TABLE 2

Variations of optical density after exposure of the radiation sensitive mixtures to ultraviolet-A radiation over 1 hour with same geometric arrangements as for ultraviolet-B exposure (Lamp spectral output centered at 350 nm, UVA > 95%, 5.71 watts).

| Time | Optical Density Measurement | | | | |
|---|---|---|---|---|---|
| (min) | Example 1 | Example 2 | Example 3 | Example 5 | Example 7 |
| 0 | 0.22 | 0.25 | 0.26 | 0.24 | 0.15 |
| 10 | 0.23 | 0.28 | 0.26 | 0.24 | 0.18 |
| 20 | 0.26 | 0.34 | 0.26 | 0.26 | 0.20 |
| 30 | 0.28 | 0.38 | 0.26 | 0.26 | 0.25 |
| 40 | 0.34 | 0.49 | 0.26 | 0.26 | 0.26 |
| 60 | 0.38 | 0.52 | 0.26 | 0.26 | 0.27 |

TABLE 3

Visual colour changes of the radiation sensitive mixtures when exposed to different light sources.

| | Conditions of Exposure | | | | | |
|---|---|---|---|---|---|---|
| | UV-B,<br>ultraviolet index = 10,<br>exposure time 30 min | | UV-A,<br>Same Geometry as for<br>UVB exposure.<br>exposure time = 30 min | | Standard laboratory fluorescent light, prolonged exposure | |
| Sample | Before exposure | After exposure | Before exposure | After exposure | Before exposure | After exposure |
| 1 | Yellow | Dark orange | Yellow | Yellow | Yellow | Yellow |
| 2 | Yellow | Deep red | Yellow | Pale orange | Yellow | Yellow |
| 3 | Yellow | Dark orange | Yellow | Yellow | Yellow | Yellow |
| 4 | Yellow | Dark orange | Yellow | Yellow | Yellow | Yellow |
| 5 | Yellow | Dark orange | Yellow | Yellow | Yellow | Yellow |
| 6 | Yellow | Red | Yellow | Yellow | Yellow | Yellow |
| 7 | Yellow | Orange-red | Yellow | Yellow | Yellow | Yellow |
| 8 | Yellow | Orange-red | Yellow | Yellow | Yellow | Yellow |

Resistance to Thermal Stress

Physical and chemical changes caused by thermal stress and aging have been responsible for failure of prior art ultraviolet radiation indicators. Several of the radiation sensitive mixtures of Examples 1–8 were tested for resistance to thermal stress over various temperatures and time periods. Tests were carried out by preparing test mixtures as described above and then heating the mixtures in a constant temperature oven at set temperatures and times. These tests are designed to simulate actual worst-case conditions in which this type of indicator might be used or stored. An ideal mixture would show no colour change following the heating and would continue to respond appropriately to exposure to ultraviolet-B radiation. According to these criteria the radiation sensitive mixtures of Examples 1 and 7, which were tested for thermal stress, are both appropriate products and are not deteriorated by this stress. The mixture of Example 1 indicated slight loss of sensitivity to ultraviolet-B radiation under the most severe test conditions.

TABLE 4

Colour change observed in test mixtures after thermal stress and after both thermal stress and exposure to ultraviolet-B radiation for 30 minutes at an Ultraviolet Potential Index of 10. All samples were yellow before the thermal stress and ultraviolet exposure.

| | Conditions of Exposure | | | |
|---|---|---|---|---|
| | Example 1 | | Example 7 | |
| Stress conditions and time | Colour following thermal stress | Colour following thermal stress and UV-B exposure | Colour following thermal stress | Color following thermal stress and UV-B exposure |
| 40° C., 24 hr | Yellow | Dark orange | Yellow | Dark orange |
| 40° C., 48 hr | Yellow | Dark orange | Yellow | Dark orange |
| 40° C., 72 hr | Yellow | Dark orange | Yellow | Dark orange |
| 50° C., 24 hr | Yellow | Dark orange | Yellow | Dark orange |
| 50° C., 48 hr | Yellow | Dark orange | Yellow | Dark orange |
| 50° C., 72 hr | Yellow | Orange | Yellow | Dark orange |

The embodiments of the invention in which an exclusive property or privilege is claimed are defined as follows:

1. A radiation indicator device for use in indicating exposure to ultraviolet-B radiation, the indicator device comprising:
   (a) a radiation sensitive mixture selectively responsive to ultraviolet radiation having a wavelength substantially within or shorter than the range of wavelengths of ultraviolet-B radiation, the radiation sensitive mixture being comprised of:
      (i) an amount of an organic halogen constituent capable of producing at least one acidic product upon exposure to ultraviolet radiation, wherein the organic halogen constituent is comprised of a compound selected from the group of compounds consisting of an adamantane having one or more halogen atoms, 1,2-dibromotetrachloroethane, 1,2,4,5-tetrabromobenzene, 1,3-dibromoadamantane and 1-iodoadamantane; and
      (ii) an amount of an indicator constituent capable of producing a change in colour in response to a change in concentration of the acidic product, so that the radiation sensitive mixture has a first colour representing a relatively low concentration of the acidic product and has a second colour representing a relatively high concentration of the acidic product; and
   (b) a graphic pattern interspersed amongst the radiation sensitive mixture, the graphic pattern having a graphic pattern colour substantially identical to one of the first colour and the second colour of the radiation sensitive mixture, the graphic pattern being visually distinguishable from the radiation sensitive mixture when the indicator constituent is not at the other of the first colour and the second colour.

2. The indicator device as claimed in claim 1 wherein the device is further comprised of a support having an indicator surface, wherein the radiation sensitive mixture is carried as a mixture layer on the indicator surface and wherein the graphic pattern is carried as a graphic layer on the indicator surface.

3. The indicator device as claimed in claim 2 wherein the graphic layer overlays the mixture layer on the indicator surface.

4. The indicator device as claimed in claim 1 wherein the organic halogen constituent is capable of producing at least one acidic product selectively upon exposure to ultraviolet radiation substantially having a wavelength substantially within or shorter than the range of wavelengths of ultraviolet-B radiation.

5. The indicator device as claimed in claim 1 wherein the organic halogen constituent is comprised of an adamantane having one or more halogen atoms.

6. The indicator device as claimed in claim 5 wherein the halogen atoms are selected from the group of halogens consisting of chlorine, bromine and iodine.

7. The indicator device as claimed in claim 1 wherein the organic halogen constituent is comprised of 1,2-dibromotetrachloroethane.

8. The indicator device as claimed in claim 1 wherein the organic halogen constituent is comprised of 1,2,4,5-tetrabromobenzene.

9. The indicator device as claimed in claim 1 wherein the organic halogen constituent is comprised of 1,3-dibromoadamantane.

10. The indicator device as claimed in claim 1 wherein the organic halogen constituent is comprised of 1-iodoadamantane.

11. The indicator device as claimed in claim 1 wherein the graphic pattern is comprised of an illustration, text, or a combination thereof.

12. The indicator device as claimed in claim 1 wherein indicator constituent is comprised of methyl orange.

13. The indicator device as claimed in claim 1 wherein the radiation sensitive mixture is further comprised of an amount of a binder for providing a matrix for the organic halogen constituent and the indicator constituent.

14. The indicator device as claimed in claim 13 wherein the binder is comprised of polyvinyl chloride.

15. The indicator device as claimed in claim 13 wherein the binder is comprised of Geon™ 136.

16. The indicator device as claimed in claim 13 wherein the binder is dissolved or dispersed in an amount of a solvent.

17. The indicator device as claimed in claim 16 wherein the solvent is comprised of tetrahydrofaran.

18. The indicator device as claimed in claim 13 wherein the radiation sensitive mixture is further comprised of an amount of a surfactant for enhancing the dispersion of the indicator constituent in the binder.

19. The indicator device as claimed in claim 18 wherein the surfactant is comprised of a surfactant selected from the group of surfactants consisting of Triton™ X-100, reduced Triton™ X-100, Niaproof™ Type 4 and Tween™ 20.

20. The indicator device as claimed in claim 19 wherein the surfactant is comprised of Triton™ X-100.

21. The indicator device as claimed in claim 1 wherein the radiation sensitive mixture is further comprised of an amount of a suppressing agent for suppressing an increase in concentration of the acidic product.

22. The indicator device as claimed in claim 21 wherein the suppressing agent is comprised of one or more buffers, bases or mixtures thereof.

23. The indicator device as claimed in claim 1 wherein the radiation sensitive mixture is further comprised of an amount of a promoter for enhancing an increase in concentration of the acidic product.

24. The indicator device as claimed in claim 1 further comprising a screen for inhibiting the exposure of the radiation sensitive mixture to radiation other than radiation having a wavelength substantially within or shorter than the range of wavelengths of ultraviolet-B radiation.

25. The indicator device as claimed in claim 24 wherein the screen is comprised of a screening layer which overlays the mixture layer.

26. The indicator device as claimed in claim 1 wherein the radiation sensitive mixture is further comprised of an amount of a screening agent.

27. The indicator device as claimed in claim 26 wherein the screening agent is comprised of a screening agent selected from the group of screening agents consisting of Parsol, phorone, menthyl anthranilate, 2-hydroxy-4-methoxybenzophenone, 2,2-dihydroxy-4-methoxybenzophenone and 2-amino-benzophenone.

28. The indicator device as claimed in claim 1 wherein the radiation sensitive mixture is further comprised of an amount of a plasticizer for enhancing the properties of the binder.

29. The indicator device as claimed in claim 28 wherein the plasticizer is comprised of a plasticizer selected from the group of plasticizers consisting of dibutyl phthalate, dioctyl phthalate, trioctyl trimellitate, epoxidized soybean oil, triphenyl phosphate and 1,2-epoxydodecane.

30. The indicator device as claimed in claim 1 wherein the graphic pattern colour is substantially identical to the second colour of the radiation sensitive mixture.

31. An indicator device for use in indicating exposure to ultraviolet-B radiation, the indicator device comprising a radiation sensitive mixture selectively responsive to ultraviolet radiation having a wavelength substantially within or shorter than the range of wavelengths of ultraviolet-B radiation, the radiation sensitive mixture being comprised of:
(a) an amount of an organic halogen constituent capable of producing at least one acidic product upon exposure to ultraviolet radiation, wherein the organic halogen constituent is comprised of a compound selected from the group of compounds consisting of an adamnantane having one or more halogen atoms, 1,2-dibromotetrachloroethane, 1,2,4,5Stetrabromobenzene, 1,3-dibromoadamnantane and 1-iodoadamantane; and
(b) an amount of an indicator constituent capable of producing a change in colour in response to a change in concentration of the acidic product, so that the radiation sensitive mixture has a first colour representing a relatively low concentration of the acidic product and has a second colour representing a relatively high concentration of the acidic product, wherein the first colour is visually distinguishable from the second colour.

32. The indicator device as claimed in claim 31 wherein the organic halogen constituent is capable of producing at least one acidic product selectively upon exposure to ultraviolet radiation having a wavelength substantially within or shorter than the range of wavelengths of ultraviolet-B radiation.

33. The indicator device as claimed in claim 31 wherein the organic halogen constituent is comprised of an adamantane having one or more halogen atoms.

34. The indicator device as claimed in claim 33 wherein the halogen atoms are selected from the group of halogens consisting of chlorine, bromine and iodine.

35. The indicator device as claimed in claim 31 wherein the indicator constituent is comprised of methyl orange.

36. The indicator device as claimed in claim 31 wherein the organic halogen constituent is comprised of 1,2-dibromotetrachloroethane.

37. The indicator device as claimed in claim 31 wherein the organic halogen constituent is comprised of 1,2,4,5-tetrabromobenzene.

38. The indicator device as claimed in claim 31 wherein the organic halogen constituent is comprised of 1,3-dibromoadamantane.

39. The indicator device as claimed in claim 31 wherein the organic halogen constituent is comprised of 1-iodoadamantane.

40. A radiation indicator device for use in indicating exposure to ultraviolet-B radiation, the indicator device comprising:
(a) a radiation sensitive mixture selectively responsive to ultraviolet radiation having a wavelength substantially within or shorter than the range of wavelengths of ultraviolet-B radiation, the radiation sensitive mixture being comprised of:
(i) an amount of an organic halogen constituent capable of producing at least one acidic product upon exposure to, ultraviolet radiation;
(ii) an amount of an indicator constituent capable of producing a change in colour in response to a change in concentration of the acidic product, so that the radiation sensitive mixture has a first colour representing a relatively low concentration of the acidic product and has a second colour representing a relatively high concentration of the acidic product; and
(iii) an amount of a binder for providing a matrix for the organic halogen constituent and the indicator constituent, wherein the binder is comprised of Geon™ 136; and
(b) a graphic pattern interspersed amongst the radiation sensitive mixture, the graphic pattern having a graphic pattern colour substantially identical to one of the first colour and the second colour of the radiation sensitive mixture, the graphic pattern being visually distinguishable from the radiation sensitive mixture when the indicator constituent is not at the other of the first colour and the second colour.

41. A radiation indicator device for use in indicating exposure to ultraviolet-B radiation, the indicator device comprising:
(a) a radiation sensitive mixture selectively responsive to ultraviolet radiation having a wavelength substantially within or shorter than the range of wavelengths of ultraviolet-B radiation, the radiation sensitive mixture being comprised of:
(i) an amount of an organic halogen constituent capable of producing at least one acidic product upon exposure to ultraviolet radiation;
(ii) an amount of an indicator constituent capable of producing a change in colour in response to a change in concentration of the acidic product, so that the radiation sensitive mixture has a first colour representing a relatively low concentration of the acidic product and has a second colour representing a relatively high concentration of the acidic product;
(iii) an amount of a binder for providing a matrix for the organic halogen constituent and the indicator constituent; and (iv) an amount of a surfactant for enhancing the dispersion of the indicator constituent in the binder, wherein the surfactant is comprised of a surfactant selected from the group of surfactants consisting of Triton™ X-100, reduced Triton™ X-100, Niaproof™ Type 4 and Tween™ 20; and (b) a graphic pattern interspersed amongst the radiation sensitive mixture, the graphic pattern having a graphic pattern colour substantially identical to one of the first colour and the second colour of the radiation sensitive mixture, the graphic pattern being visually distinguishable from the radiation sensitive mixture when the indicator constituent is not at the other of the first colour and the second colour.

42. The indicator device as claimed in claim 41 wherein the surfactant is comprised of Triton™ X-100.

43. A radiation indicator device for use in indicating exposure to ultraviolet-B radiation, the indicator device comprising:

(a) a radiation sensitive mixture selectively responsive to ultraviolet radiation having a wavelength substantially within or shorter than the range of wavelengths of ultraviolet-B radiation, the radiation sensitive mixture being comprised of:

(i) an amount of an organic halogen constituent capable of producing at least one acidic product upon exposure to ultraviolet radiation;

(ii) an amount of an indicator constituent capable of producing a change in colour in response to a change in concentration of the acidic product, so that the radiation sensitive mixture has a first colour representing a relatively low concentration of the acidic product and has a second colour representing a relatively high concentration of the acidic product; and (iii) an amount of a screening agent, wherein the screening agent is comprised of a screening agent selected from the group of screening agents consisting of Parsol, phorone, menthyl anthranilate, 2-hydroxy-4-methoxybenzophenone, 2,2-dihydroxy-4-methoxybenzophenone and 2-aminobenzophenone; and (b) a graphic pattern interspersed amongst the radiation sensitive mixture, the graphic pattern having a graphic pattern colour substantially identical to one of the first colour and the second colour of the radiation sensitive mixture, the graphic pattern being visually distinguishable from the radiation sensitive mixture when the indicator constituent is not at the other of the first colour and the second colour.

* * * * *